(12) United States Patent
Gregory

(10) Patent No.: US 6,363,784 B1
(45) Date of Patent: Apr. 2, 2002

(54) FLUID DETECTOR

(75) Inventor: Malcolm David Gregory, Smithfield (AU)

(73) Assignee: Liquip Sales Pty Limited, Smithfield (AU)

( * ) Notice: Subject to any disclaimer, the term of this patent is extended or adjusted under 35 U.S.C. 154(b) by 0 days.

(21) Appl. No.: 09/500,128

(22) Filed: Feb. 8, 2000

(51) Int. Cl.$^7$ ................................................ G01F 23/00
(52) U.S. Cl. .......................................................... 73/293
(58) Field of Search ............................. 73/293, 290 R, 73/866.5; 250/902, 903

(56) References Cited

U.S. PATENT DOCUMENTS

| | | | |
|---|---|---|---|
| 4,242,590 A | * 12/1980 | Von Tluck | 250/577 |
| 4,809,551 A | * 3/1989 | Grossiord | 73/327 |
| 4,848,149 A | 7/1989 | Fiorentino et al. | |
| 4,979,797 A | * 12/1990 | Nemeth | 350/96.29 |
| 4,998,022 A | * 3/1991 | Tregay | 250/577 |
| 5,381,022 A | * 1/1995 | Nemeth et al. | 250/577 |
| 5,399,876 A | * 3/1995 | Laclair | 250/564 |
| 5,889,284 A | * 3/1999 | Mattis | 250/577 |
| 6,049,088 A | * 4/2000 | Harding | 250/577 |

FOREIGN PATENT DOCUMENTS

GB          2171796 A         9/1986

\* cited by examiner

Primary Examiner—Hezron Williams
Assistant Examiner—Willie Morris Worth
(74) Attorney, Agent, or Firm—Marshall, Gerstein, & Borun

(57) ABSTRACT

The present invention relates generally to a fluid level detector 1 designed to be mounted in a vessel which is arranged to contain a liquid which may be hazardous such as a petrochemical. The liquid level detector is mounted within a port 2 in a wall 3 of a vessel. The electrical componentry of the liquid level detector 1 includes a light transmitter 6 for transmitting light towards an optical element 7, and a light receiver 8 for receiving light reflected back from the optical element 7. Electrical circuitry is mounted on a printer circuit board 9 for detecting signals from the light receiver and controlling the transmission of light via the light transmitter 6. the entire componentry is potted in a potting compound 11 to protect the componentry from chemical and physical damage and the physically support it. The arrangement of epoxy and componentry is substantially enveloped by a glass housing 12.

6 Claims, 1 Drawing Sheet

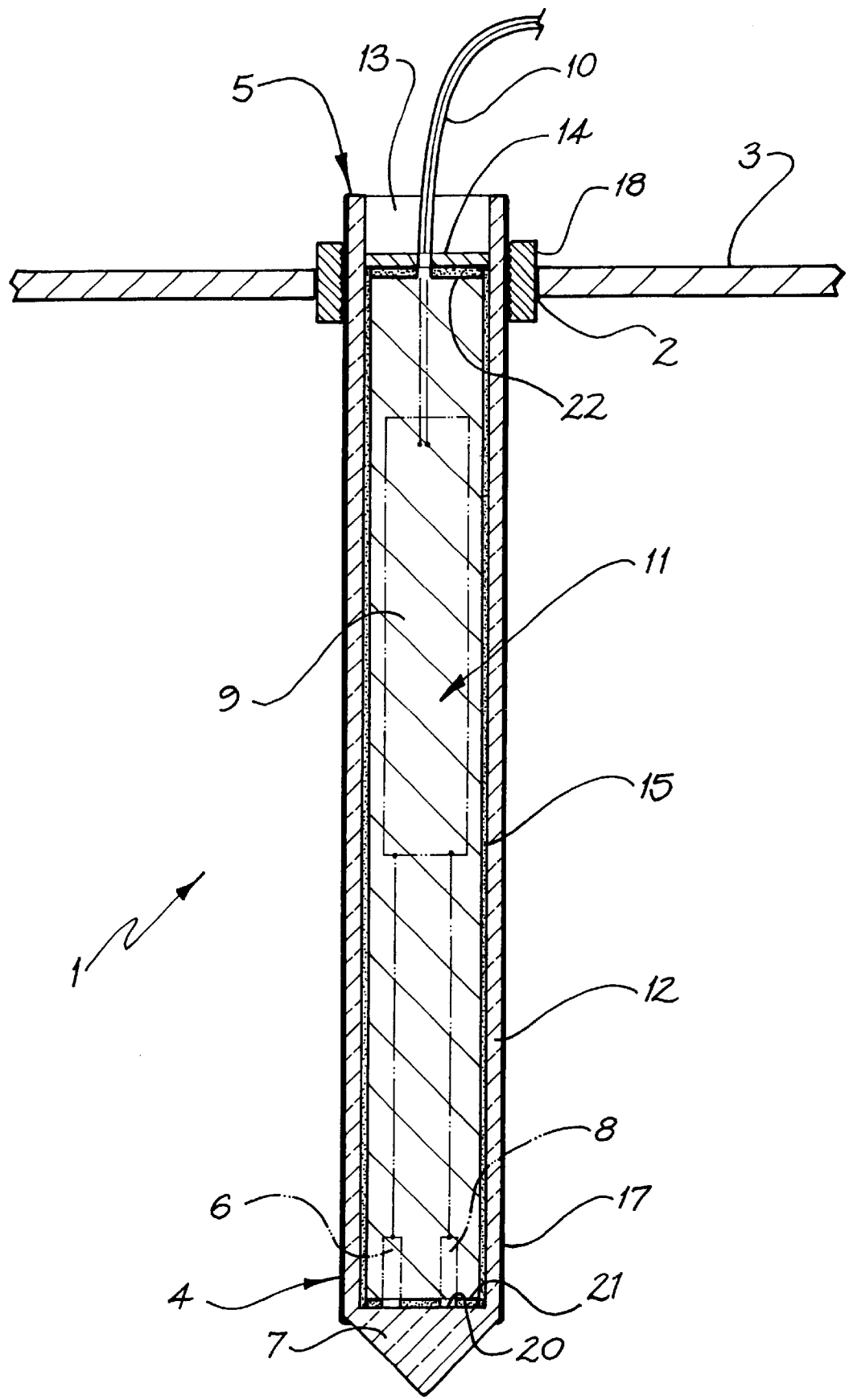

FLUID DETECTOR

FIELD OF THE INVENTION

The present invention relates to a fluid detection device and, particularly, but not exclusively, a fluid detection device which is used to detect the level of a hazardous fluid within a vessel.

BACKGROUND TO THE INVENTION

Liquid level detection sensors are known and have application such as to detect the level of liquids in vessels. For example, liquid level detectors are used for over-fill protection in petrochemical tanks.

Liquid detection devices are known for this application which utilise the principle that a beam of light transmitted through glass can be re-directed at the boundary of the glass according to the refractive index of the surrounding medium. These liquid level detection devices usually comprise a glass prism and, when the glass surface is not in the liquid, light transmitted to the glass prism is reflected back internally to a photo detector, while if the surface of the prism is in a non-reflective liquid, the light is almost completely refracted out into the liquid. If a signal is received by the light detector, therefore, the probe is not in liquid. If a signal is not received, either the probe is in liquid or a fault has occurred.

In prior art liquid level detectors of this form, the detection prism, which is of varying degrees of complexity, is usually housed in a metallic "tip", typically of stainless steel, and held in position by a hard-setting epoxy. Light emitters and receivers are glued or fixed in precise places relative to the glass prism and a rear body houses the processing electronics. The rear body is fixed to the tip and potted to produce the finished assembled "probe" (a term generally used for such devices). The internal electronics is also potted within the rear body. As such probes are often used with hazardous liquids, it is important that the electronics is protected from the hazardous liquid and any fumes.

The probe is usually mounted in a vessel (e.g. petrochemical tank) usually mounted extending through the wall of the vessel with the cable-end of a conductive cable connected to the electronics being external to the vessel.

There are a number of problems with present probe constructions. In particular, the epoxies used to house and seal the glass prism may be chemically attacked by many of the products handled by industry. This can lead to a dangerous situation where operating electronics may be exposed. Even the stainless steels used to construct the probe tips are frequently attacked.

This means that most probes are used only for a "normal" liquid such as motor vehicle fuel. Even specially made probes using materials such as stainless steel and polytetrafluroethylene have limited use.

There are also a number of joints (electrical and mechanical) in the probe and this can lead to potential leak paths into the electronics.

Further, current probes are costly because of the complexity of assembly required and material costs.

SUMMARY OF THE INVENTION

According to one aspect of the present invention there is provided a fluid level detector comprising a light transmitter for transmitting light to an optical element, a light receiver for receiving light reflected from the optical element, electrical circuitry for detecting signals from the light receiver, and a glass housing substantially encapsulating the light receiver, light transmitter and electrical circuitry, whereby to protect the detector from hazardous environments.

Preferably, any type of glass material may be used to form the glass housing, and other transparent materials with high temperature capabilities, the suitable refractive index properties and also, if chemical resistance to hazardous chemicals, may be used. The term "glass" used in the preceding paragraphs should be taken to encompass such materials.

Preferably, the glass housing has an open end where an electrical cable connected to the electrical circuitry within the housing can exit. Preferably, in use, this open end is not placed within the liquid environment. Where the environment is a vessel, such as a fuel tank, the detector is preferably mounted through a passageway in the wall of the vessel, so that the open end of the glass housing is on the outside of the vessel and the rest of the glass housing extends within the vessel. This has the advantage that only the glass housing is exposed to any potential hazardous chemical. There are no joints and the only surface exposed to the liquid is glass. As glass is relatively inert, this liquid level detector may be used with almost any liquid with no risk of permeation through joints which may damage the operation of the unit.

The components within the glass housing (light receiver, electrical circuitry and light transmitter and any other components) are preferably potted with a potting compound e.g. epoxy. This potting provides further protection against access to the componentry, and also physically stabilises and supports the componentry so that it is protected from mechanical damage. Preferably, the potting material is introduced through the open end of the glass body after the componentry has been inserted into the glass housing, and when the potting compound has been introduced an end seal is provided about a cable exiting the open end of the glass housing.

The optical element is preferably provided by a portion of the glass housing itself. Preferably, the distal end of the glass housing body, opposite the open end, is formed as a glass prism for acting as the optical element.

One further problem that needs to be addressed in relation to the probe of the present invention, is that is there is a very large difference in coefficient of thermal expansion between any glass (very low expansion) and the typical potting compound such as epoxy (very high expansion). A liquid detector in accordance with the present invention is required to survive environments ranging from −40° C. to +120° C., and at this range the relative movement between potting compound and glass would be sufficient to crack the glass and delaminate the bond between the potting compound and the glass, unless further measures are taken.

A further preferred feature of the present invention, is the provision of a layer of compressible material between the potting compound and the glass housing. The compressible material is preferably a foam material.

The compressible material is preferably sufficiently compressible to absorb expansion and contraction differences between the potting material and the glass housing, due to temperature changes. Using such a compressible material preferably prevents the glass housing from breaking.

Preferably, during assembly of the liquid sensor, the foam material is mounted to the inside of the glass housing before potting compound is introduced.

According to another aspect of the present invention there is provided a fluid level detector comprising a light transmitter for transmitting light to an optical element via light transmission means, a light receiver for receiving light reflected from the optical element via said light transmission means, electrical circuitry for detecting signals from the light receiver, said light transmitter, light receiver and electrical circuitry being located remote from the optical element.

Preferably the optical element is formed by a prism-shaped portion of a glass housing which houses at least part of the light transmission means. Alternatively the optical element is formed by a prism-shaped portion of the light transmission means itself.

Typically the light transmission means is in the form of a pair of fibre optic cables being configured to transmit light from and to the light transmitter and light receiver, respectively.

According to a further aspect of the present invention there is provided a method of manufacturing a fluid level detector, comprising the steps of forming a glass envelope with an open end and an optical element formed within the wall of the glass housing, inserting through the open end a light transmitter for transmitting light to the optical element, a light receiver for receiving light reflected from the optical element, and electrical circuitry for detecting signals from the light receiver.

Preferably the method further comprises a step of introducing potting material through the open end of the housing, to pot the light transmitter, light receiver and electrical circuitry. More preferably the method also comprises a step of, before introducing the potting material, lining the inner surface of the glass housing with a compressible material which is sufficiently compressible to absorb expansion and contraction differences between the potting material and the glass housing, due to temperature changes.

DETAILED DESCRIPTION OF THE PREFERRED EMBODIMENT

Features and advantages of the present invention will become apparent from the following description of an embodiment thereof, by way of example only, with reference to the accompanying drawing, which is a cross-sectional schematic diagram of a liquid detector in accordance with an embodiment of the present invention.

Referring to the drawing, a liquid level detector 1 is illustrated in cross-section. The liquid level detector 1 may be mounted in a vessel which is arranged to contain a liquid, which may be hazardous. For example, the liquid may be a petrochemical and the vessel may be a petrochemical tank. In the drawing, the liquid level detector is shown mounted within a port 2 in the wall 3 of a vessel, a distal end 4 of the liquid level detector 1 extending within the vessel and a proximal end 5 of the liquid level detector 1 extending out of the vessel through the port 2. Only a portion of the wall 3 of the vessel is shown in the diagram but it will be appreciated that the wall 3 would in fact extend to enclose the vessel. The electrical componentry of the liquid level detector 1 is shown in ghost outline. It comprises a light transmitter 6 for transmitting light towards an optical element 7, and a light receiver 8 for receiving light reflected back from the optical element 7. Electrical circuitry is mounted on a printed circuit board 9, for detecting signals from the light receiver and controlling the transmission of light via the light transmitter 6. An electrical cable 10 makes connection with the circuit board. in operation, the device may be connected to a display, such as an LED display for indicating liquid level.

The entire componentry is potted in a potting compound 11, which may be epoxy, to protect the componentry from chemical and physical damage and to physically support it.

The arrangement of epoxy and componentry is substantially enveloped by glass housing 12. The glass housing extends all the way about the detector where the detector 1 extends within the vessel. The proximal end 5 of the detector is formed as an opening 13 which is sealed by an end seal 14, which way be of any suitable material.

In manufacture, the glass housing is formed and the components are then inserted through the open end 13 and potted within the housing 12.

The distal end 4 of the glass housing 12 is formed as a prism 7 to provide the required optical qualities for the liquid level detector.

On the inside walls of the glass housing 12, a layer of compressible material 15 is mounted. The compressible material 15 extends cylindrically substantially the length of the inside of the glass housing 12, as illustrated in the drawing. The liquid level detector may be required to survive environments ranging from temperatures of −40° C. to +120° C. Thermal expansion of potting materials (e.g. epoxy) is usually very high and that of glass usually very low. There is therefore relative movement between the potting compound 11 and the glass body 12. The layer of compressible material 15 absorbs the expansion and contraction stresses, so that the glass housing 12 does not break.

The compressible material 15 is in this embodiment a foam material (gas bubbles trapped in an enveloping fabric). This can be created by spraying or painting the inside surface of the glass housing 12 or can be formed by folding a flat sheet or cutting a tubular extrusion.

Any other material can be used as a compressible material as long as the compressibility is sufficient to absorb relative movement of the potting material and the glass material without transmitting excessive force to the glass housing 15.

A disk 21 of compressible material extends across the bottom wall 20 of the glass housing 12, to take up relative expansion and contraction lengthwise. There are gaps in the disk for the transmitter and detector 6, 8. Similarly, at the proximal end of the detector 1, a further disk 22 of compressible material is provided to cope with relative expansion and contraction lengthwise.

In operation, light is transmitted from the light transmitter 6 to the prism 7. If the prism 7 is within a non-reflective liquid, the light will be refracted outwardly of the prism and not reflected to the receiver 8. If the prism 7 is not immersed in liquid, the light will be totally internally reflected from the prism 7 to the receiver 8. If the light signal is received by the electronic circuitry 9, therefore, it is indicative that the liquid level in the vessel has dropped below the level of the prism 7. This information can be used for control purposes or for indication purposes. The liquid level detector, because it is protected within a glass envelope can be used for hazardous chemicals, as glass is relatively inert.

Protective heat shrink material 17 is placed around the outside of the glass housing 12, for further protection. For particularly severe chemicals, the liquid level detector may be mounted in a polytetrafluroethylene mounting 18 within the port 2 in the vessel 3, so that no vulnerable material whatsoever is exposed to the contents of the vessel.

A liquid level detector in accordance with the present invention can have many applications for liquid level detection. It is not just limited to the detection of the level of a petrochemical within fuel tanks. It could be used in the hazardous chemical industry, for example, to detect the level of hazardous liquids within any type of vessel.

The fluid level detector could, indeed, be used for detection of any fluid where the refractive index of the fluid varies sufficiently to provide differentiation.

The illustrated embodiment described above includes only one light transmitter 6 and one light receiver 8. It will be understood that there may be more than one light transmitter and receiver mounted within the glass housing.

In an alternative embodiment of the fluid level detector, it may be preferred to position some of the components described in the glass housing in a place remote from the housing. This removes electronic components from excessive heat or vibration. It also permits monitoring of multiple optical elements from only one set of electronics. It is also an advantage where this is a lack of space.

In this alternative embodiment the detector operates as described above except that light transmission means in the form of fibre optic cable will be used to transmit light to and from the optical element or prism with processing of light signals into electrical signals occurring remotely. Such an arrangement still includes all the features of the preceding embodiment, the difference being the location of components of the detector.

In this alternative embodiment, the fluid level detector includes an optical element in the form of a prism, connectors to light transmission means in the form of one or more fibre optic cables, and sealing devices together with a mounting mechanism being designed to seal to the tank wall. One embodiment may include a pair of fibre optic cables set within the prism so as to transmit and receive light, respectively. In another variant, the light transmission means includes a pair of fibre optic cables themselves being formed at an end into a prism by, for example, fusing the two cable ends and shaping to a prism. Thus, the optical device is within the twinned light transmitting cable and the probe consists only of glass with no joints.

The use of light transmission means or fibre optic cabling allows the electrical componentry of the fluid level detector to be mounted remotely from the liquid level sensor body. Such construction can be advantageous in removing the electrical componentry from excessive heat or vibration in the vessel to which the sensor is mounted. It also enables the possibility of building-in redundancy such that if the electrical componentry develops a fault and ceases to work, a second, separate, electrical system can be utilised to ensure continued operation of the process in safety.

Variations and modifications may be made to the invention as shown in the specific embodiments without departing from the spirit or scope of the invention as broadly described. The present embodiments are, therefore, to be considered in all respects as illustrated and not restrictive.

What is claimed is:

1. A fluid level detector comprising a light transmitter for transmitting light to an optical element, a light receiver for receiving light reflected from the optical element, electrical circuitry for detecting signals from the light receiver, and a glass housing substantially encapsulating the light receiver, light transmitter and electrical circuitry, whereby to protect the detector from hazardous environments, the internal volume of the glass housing, is substantially filled with a potting material for mechanical protection and mounting of the light receiver, light transmitter and electrical circuitry, the fluid level detector further comprising a layer of compressible material lining the inner surface of the glass housing between the inner surface of the glass housing and the potting material, the compressible material being sufficiently compressible to absorb expansion and contraction differences between the potting material and the glass housing, due to temperature changes.

2. A fluid level detector in accordance with claim 1, wherein the glass housing is open at one end and wherein in use this one end is mount ed extending outside of the hazardous environment, so that within the hazardous environment the glass housing completely envelopes and protects the light receiver, light transmitter and electrical circuitry.

3. A fluid level detector in accordance with claim 1, wherein the optical element is formed by a portion of the glass housing.

4. A fluid level detector in accordance with claim 2, wherein the optical element is formed by a portion of the glass housing.

5. A fluid level detector in accordance with claim 1, wherein the optical element is formed by a prism-shaped portion of the glass housing.

6. A method of manufacturing a fluid level detector, comprising the steps of forming a glass envelope with an open end and an optical element formed within the wall of the glass housing, inserting through the open end a light transmitter for transmitting light to the optical element, a light receiver for receiving light reflected from the optical element, and electrical circuitry for detecting signals from the light receiver, lining the inner surface of the glass housing with a compressible material, introducing potting material through the open end of the housing, to pot the light transmitter, light receiver and electrical circuitry, wherein the compressible material is sufficiently compressible to absorb expansion and contraction differences between the potting material and the glass housing, due to temperature changes.

* * * * *

UNITED STATES PATENT AND TRADEMARK OFFICE
CERTIFICATE OF CORRECTION

PATENT NO. : 6,363,784 B1
DATED : April 2, 2002
INVENTOR(S) : Gregory

It is certified that error appears in the above-identified patent and that said Letters Patent is hereby corrected as shown below:

<u>Column 6,</u>
Line 22, replace "mount ed" with -- mounted --.

Signed and Sealed this

Twenty-eighth Day of January, 2003

JAMES E. ROGAN
*Director of the United States Patent and Trademark Office*